United States Patent [19]

Bernin

[11] 3,958,203

[45] May 18, 1976

[54] POSITIONAL TRANSDUCER UTILIZING MAGNETIC ELEMENTS

[75] Inventor: Victor M. Bernin, Mount Prospect, Ill.

[73] Assignee: Illinois Tool Works Inc., Chicago, Ill.

[22] Filed: Sept. 15, 1975

[21] Appl. No.: 613,156

Related U.S. Application Data

[63] Continuation of Ser. No. 518,310, Oct. 29, 1974, abandoned.

[52] U.S. Cl. .............................. 336/110; 340/197; 336/132; 340/174 PM; 340/174 VC
[51] Int. Cl.² .................. H01F 21/00; G08C 19/06
[58] Field of Search ...... 340/197, 174 PM, 174 VC; 336/110, 132

[56] References Cited
UNITED STATES PATENTS 3,305,770   2/1967   Hulls................................. 340/197

*Primary Examiner*—Thomas B. Habecker
*Attorney, Agent, or Firm*—Glenn W. Bowen; Robert W. Beart

[57] ABSTRACT

A positional transducer is disclosed which utilizes an elongated, hollow, cylindrical tube of a magnetically saturable material, a sense wire that runs through the tube parallel to its elongated axis and a pair of elongated, generally rectangular shaped magnets of opposite polarity which have a length that is no greater than the length of the tube and which are closely positioned adjacent diametrically opposite exterior portions of the tube. As the magnets move over in the tube, they provide substantially complete saturation of the tube in the portion over which they extend while the remaining portion of the tube remains unsaturated thereby giving a linear indication of the position of the magnets with respect to the tube.

6 Claims, 6 Drawing Figures

U.S. Patent   May 18, 1976   3,958,203
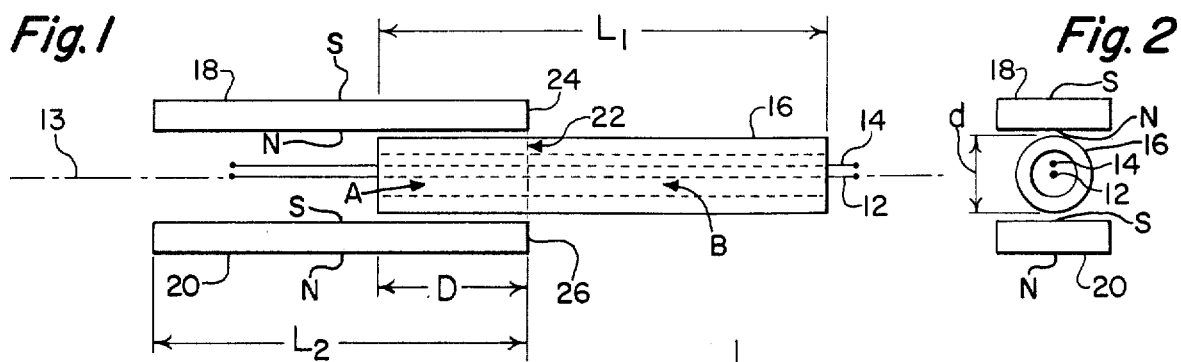
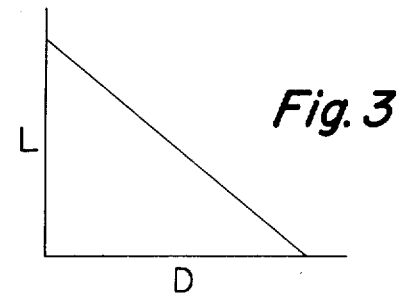
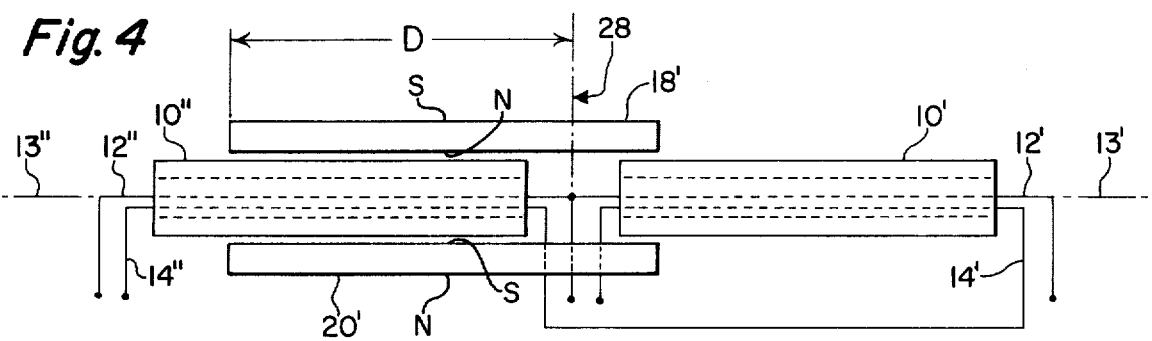
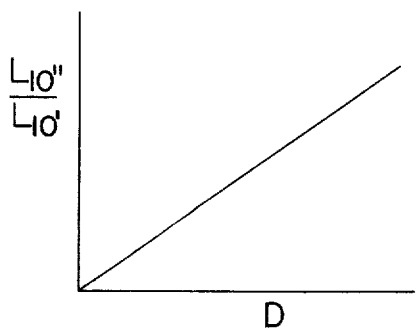
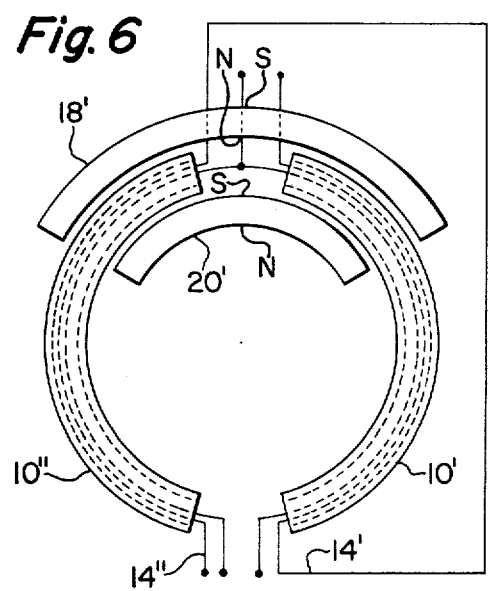

POSITIONAL TRANSDUCER UTILIZING MAGNETIC ELEMENTS

This is a continuation of application Ser. No. 518,310, filed Oct. 29, 1974 now abandoned.

BACKGROUND OF THE INVENTION

The present invention relates to a positional sensing transducer which utilizes an elongated tube constructed of a magnetically saturable material. A sense wire runs through the tube parallel to the elongated axis of the tube and a pair of oppositely polled magnets are positioned on diametrically opposite exterior portions of the tube so that the magnetic flux from the magnets will completely saturate the portion of the tube that lies between the magnets, while the remaining portion of the tube remains unsaturated. The use of a ferrite element that is of a toroidal shape and is positioned between two saturating magnets to produce an output signal on a sense line that runs through the core is disclosed in U.S. Pat. No. 3,638,221, issued in the name of Victor M. Bernin on Jan. 25, 1972, and assigned to the assignee of the present invention. The apparatus of the Bernin patent is a keyboard switch in which the entire toroidal core is completely saturated when the magnets are lowered on a keystem into the vicinity of the cores. In order to accomplish the purposes of the Bernin patent, the core of the switch of that patent is positioned so that its axis is parallel to the wide part of the magnets which are of a substantially greater dimension than is the thickness of the core.

The present invention, by contrast, uses a hollow, elongated, cylindrical tube constructed of a material which is magnetically saturable, a sense wire that runs through the tube, and two oppositely polled magnets that move along the outside of the tube in order to provide an accurate linear indication of the position of the magnets with respect to the tube on the sense line. In other words, the present invention does not provide a "1" or a "0" output signal, but instead it may be used to accurately determine the position of the saturating magnets with respect to the tube. The portion of the elongated tube that lies between the magnets is saturated while the remaining portion is not. Because the tube provides a closed flux path, there is no substantial fringing affect at the ends of the saturating magnets; and, therefore, the portion of the tube that is not between the magnets remains substantially unsaturated. Since the output signal that is provided on the sense wire through the tube is not dependent upon the magnetic characteristics of the tube, but merely upon the position of the magnets with respect to the tube, a very linear output signal is achieved. In addition, problems that affect magnetic sensors that depend on partial saturation of the sensing element, such as temperature variation and aging variation, are also eliminated. Moreover, magnetic force that is required to operate the device of the present invention is not critical because of reliance on saturation of the tube between the magnets to produce the output signal. This is in direct contrast to sensing devices such as those shown in the McAdam patent No. 2,915,637 where the magnetic saturation of the entire toroidal core is affected by the position of the adjacent magnet; and, thus, the core is subject to the previously mentioned temperature and aging defects; and the device has a critical magnetic force requirement for the control magnet.

DESCRIPTION OF THE DRAWINGS

The present invention is illustrated by reference to the drawings in which:

FIG. 1 is a side view of a single tube embodiment of the present invention;

FIG. 2 is an end view of the embodiment of the transducer of FIG. 1;

FIG. 3 is a graph showing the relationship between the position of the saturating magnets and the inductance of the device operated as an inductance element and constructed in accordance with FIG. 1;

FIG. 4 is an embodiment of the present invention in which two tubes are connected together to form a differential potentiometer;

FIG. 5 is a graph showing the relationship of the ratio of the inductances of the two tubes of FIG. 4 with respect to the displacement of the saturating magnets; and FIG. 6 is an embodiment which two tubes are utilized to form a differential potentiometer in which the tubes are bent into a semi-circular shape.

TECHNICAL DESCRIPTION OF THE INVENTION

The positional transducers of the present invention are highly linear, contactless, very accurate and reliable, capable of functioning in severe environments and are relatively low in cost. The manner in which the linear transducer is constructed is shown in FIG. 1 in which the elongated hollow tube 10 may be constructed of a ferrite or other suitable material which is capable of being magnetically saturated. If an inductive version of the transducer is desired, a single sense wire 12 may pass through the tube parallel to the elongated axis of the tube. Alternately, a drive wire 14 could also be inserted into the tube 10 and could be supplied with an electrical current pulse in order to provide transformer action between the drive wire 14 and the sense wire 12. By use of the cylindrical hollow tube 10, a closed magnetic flux path is provided around the sense wire 12 through the walls 16 of the tube 10.

The actual length of the tube 10 is dependent upon the type and the accuracy of sensing that is desired. In general, however, the elongated dimension $L_1$ of the tube will be on the order of at least ten times the thickness of conventional toroidal cores that are commercially available for magnet memory core applications; and the elongated dimension $L_1$ of the tube 10 will generally be over one inch if relatively accurate sensing is required. The elongated dimension $L_2$ of the magnets 18,20 is preferably slightly shorter than the length $L_1$. The longer the tube, the more highly accurate the sensing device becomes. The relative position of a pair of magnets 18,20 which are oppositely polled and which are adjacent the exterior of the periphery of the walls 16 determines the output signal that appears in the sense wire 12. As the magnets 18,20 travel from the left and the right, as viewed in FIG. 1, they will substantially saturate a greater and greater volume of the tube 10. In the position shown in FIG. 1, the portion A of the tube 10 between the magnets 18,20 will be substantially saturated; while the portion B outside of the magnets 18,20 will be substantially unsaturated. Although there will be some degree of saturation in the vicinity of the boundary line 22 between portions A and B, this will be very small because of the close proximity of the magnets 18,20 to each other and because of the closed magnetic flux path provided by the walls 16.

As the magnets 18,20 move to the left or the right over the tube, a respective different amount of the volume of the tube is magnetically saturated so as to give an indication on the sense line of the relative position of the tube 10 with respect to the magnets 18,20. Since each portion of the tube is either completely saturated or is substantially unsaturated, the device is virtually free from temperature and aging affects and it does not require a critical magnetic force, as would be the case if the entire structure of the tube 10 were partially magnetically saturated by the magnets 18,20. Thus, the tube 10 can be saturated incrementally with a high degree of magnetic resolution and control. To achieve this result, there must be a high ratio of the length $L_1$ of the tube 10 to its diameter d so that the small air gap between the magnets 18,20 and the wall 16 results in a more confined and controllable flux configuration so that the transducer is not flux density sensitive.

The tube 10 may be extruded resulting in a high uniformity of cross-sectional area which contributes to transducer accuracy. Also, since inductive windings are not wound about the tube 10, the magnets 18,20 may be placed close to the wall 16 and a small wall thickness of the wall 16 contributes to high magnetic resolution also. The graph of FIG. 3 shows that as the distance D from the lefthand side of the tube to the righthand sides 24,26 of the magnets 18,20, respectively, increases, the inductance of the tube 10 decreases in a substantially linear manner in accordance with the relative position of the magnets 18,20 and the tube 10.

As noted above, the transducer of the present invention may alternately be implemented as a transformer element by the addition of a drive line 14 in the embodiment of FIG. 1 to the inductive embodiment which utilizes only the sense line 12. In addition, the present invention may be connected in a combination with other elements or with additional transducers. For example, the embodiment of FIG. 4 shows a configuration in which a first magnetic tube 10' is positioned near a second magnetic tube 10'' so that the axis of the elongated dimensions of the tubes are aligned. The sense wires 12' through the tube 10' and the sense wire 12'' through the tube 10'' are connected together at their midpoints to form a three-terminal output device which is utilizable as a differential potentiometer. As the magnets 18',20' move over the tubes 10',10'', various portions of the respective tubes become saturated and unsaturated. FIG. 5 shows the relationship of the distance D' from the centerline C midway between the lefthand end of the tube 10' and the righthand end of the tube 10'' to the lefthand end of the magnets 18',20' as they move to the right, as viewed in FIG. 4, with respect to the ratio of the inductance of the tube 10'' to the inductance of the tube 10'' for an inductor embodiment. A similar linear inductance ratio is obtained as the magnets move to the right. Like the embodiment of FIG. 1, the device may be converted to a transformer type device merely by the addition of the drive lines 14',14'' which are not used in the inductor version. The embodiment of FIG. 4 can also be modified by adding drive wires 14',14'' to form a differential transformer configuration. In this case, the righthand sides of the leads 14',14'' are connected together to form the output windings of the potentiometer while the leads 12',12'' again from the sense windings.

FIG. 6 is another version of the device of FIG. 4 in which the tubes 10',10'' are bent in a semi-circular shape so as to conserve space, and the magnets 18',20' are correspondingly bent to pass over the exterior of the tubes 10', 10''. It is noted that the outer tube 18' is somewhat longer than the inside magnet 20'.

When only the sense wire is employed in the device of FIG. 1; and if it is used as an inductor sensing element, an AC excitation signal is normally used. Excitation is generally from a current source so that the voltage across the inductive transducer will be directly proportional to the variation of inductance caused by the relative position of the magnets 18',20' and the tubes 10',10''. The inductor may be coupled to an oscillator circuit for sensing in a conventional manner.

If a three-terminal potentiometer transducer is desired, as shown in FIG. 4, a constant voltage excitation may be impressed across the sense lines 12',12''. If the drive lines 14',14'' are added to the embodiment of FIG. 4 to form a transformer type transducer, they are connected in phase opposition so that when the magnets 18',20' are positioned so that the centerline 28 bisects their length dimension $L_2$, a null output signal will result. As the magnets move in one direction or the other, the output signal varies from its null position and undergoes a phase reversal as the center of the magnets pass over the centerline 28.

The invention is claimed as follows:

1. A sensing device comprising a cylindrical, elongated, hollow tube having an elongated axis and constructed of material which is magnetically saturable, at least one sense wire that passes through said tube in a direction substantially parallel to the elongated axis of said tube and a pair of opposite magnetic poles diametrically opposed adjacent the outer periphery of said tube which completely magnetically saturate the portion of said tube which is disposed intermediate said magnetic poles but which are substantially ineffective in magnetically saturating the remaining portion of said tube.

2. A sensing device as claimed in claim 1 wherein said tube has a single sense wire that passes through it and said device is employed as an inductance that varies as a function of the relative position of said magnetic poles with respect to said tube.

3. A sensing device as claimed in claim 1 wherein said tube has a sense line that passes through it and a drive wire which conducts drive current and passes through said tube in a direction substantially parallel to the elongated axis of said tube and said device is employed as a transformer that provides an output signal on said sense line which varies as a function of the relative position of said magnetic poles with respect to said tube.

4. A sensing device comprising an elongated, hollow tube having an elongated axis and constructed of a material which is magnetically saturable, at least one sense wire that passes through said tube in a direction substantially parallel to the elongated axis of said tube and elongated permanent magnet means constructed to completely magnetically saturate a portion of said tube which is disposed adjacent said magnet means and to be substantially ineffective in magnetically saturating the remaining portion of said tube so that the total volume of said tube which is completely magnetically saturated varies in a controlled manner in accordance with the position of said magnet means relative to said tube.

5. A sensing device as claimed in claim 4 wherein said tube has a sense wire that passes through it and said device is employed as an inductance that varies as a function of the relative position of said permanent magnet means with respect to said tube.

6. A sensing device as claimed in claim 4 wherein said tube has a sense line that passes through it and a drive line which conducts drive current and passes through said tube in a direction substantially parallel to the elongated axis of said tube and said device is employed as a transformer that provides an output signal on said sense line which varies as a function of the relative position of said magnet means with respect to said tube.

* * * * *